United States Patent [19]
Razdan et al.

[11] 3,734,930
[45] May 22, 1973

[54] DIRECT SYNTHESIS OF (−)-TRANS-Δ⁹-TETRAHYDROCANNABINOL FROM OLIVETOL AND (+)-TRANS-Δ²-CARENE OXIDE

[75] Inventors: Raj Kumar Razdan, Belmont; G. Richard Handrick, Lexington, both of Mass.

[73] Assignee: The United States of America as represented by the Secretary of the Department of Health, Education and Welfare

[22] Filed: Sept. 22, 1971

[21] Appl. No.: 182,841

[52] U.S. Cl.............................260/345.3, 424/283
[51] Int. Cl. .................................................C07d 7/24
[58] Field of Search.................................260/345.3

[56] References Cited

UNITED STATES PATENTS 3,668,224  6/1972  Petrzilka ...........................260/345.3

Primary Examiner—John M. Ford
Attorney—Holman & Stern

[57] ABSTRACT

A one step stereospecific synthesis of Δ⁹-tetrahydrocannabinol by the condensation of olivetol with Δ²-carene oxide is disclosed.

7 Claims, No Drawings

DIRECT SYNTHESIS OF (−)-TRANS-Δ9 TETRAHYDROCANNABINOL FROM OLIVETOL AND (+)-TRANS-Δ -CARENE OXIDE

This invention relates to the synthesis of tetrahydrocannabinol and more particularly to the synthesis of tetrahydrocannabinol by the condensation of olivetol with carene oxide.

Much has been written about marijuana and hashish and the physiological effects thereof. These materials are being used by ever-increasing numbers of people thereby leading to serious legal and sociological problems. Many of these problems are the result of ignorance of the effects and mechanisms of these materials. This ignorance, in turn, has resulted from a lack of proper scientific study.

Over a period of 5 to 10 years there has been considerable investigation into the mechanism of the psychotomimetic effects of marijuana. The major component of marijuana has been identified as tetrahydrocannabinol. In order to perform the necessary research into the material, however, it would be helpful to have a readily available source of tetrahydrocannabinol so that one need not rely on the crude extract. To this end, various methods have been devised for artificially synthesizing tetrahydrocannabinol.

Several of these methods involve the preparation of Δ8-tetrahydrocannabinol by the condensation of olivetol with either (−)-verbenol or cis or trans-p-mentha-2,8-dien-1-ol followed by the conversion of the same to (−)-trans-Δ9-tetrahydrocannabinol by the addition and elimination of hydrogen chloride. The reactions can be illustrated as follows:

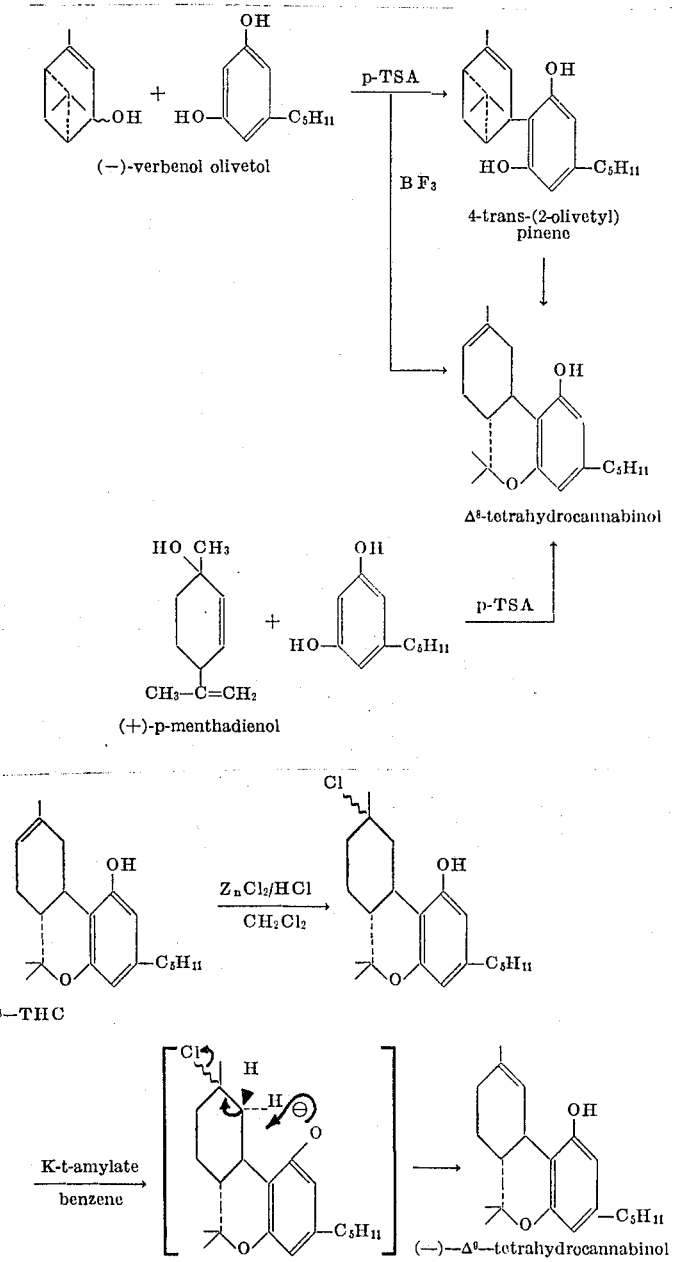

Various other methods have been proposed, each requiring several steps and, therefore, being unduly cumbersome.

It is therefore a primary object of the present invention to provide a one-step method for the preparation of tetrahydrocannabinol.

It is another object of the present invention to provide a one-step stereospecific synthesis of (−)-trans-Δ⁹-tetrahydrocannabinol.

Pursuant to the present invention, it has been found that (+)-trans-Δ²-carene oxide can be condensed with olivetol in the presence of an acid catalyst to form tetrahydrocannabinol. The reaction could be conducted without a catalyst, but a relatively high temperature, in the order of 140° C, is required. By using an acid catalyst, the reaction can be run at fairly low temperatures, the same generally being run in an ice bath. The acid catalyst could be boron trifluoride or p-toluenesulfonic acid, although boron trifluoride, as will be seen hereinbelow is preferred. Generally the reaction is as follows:

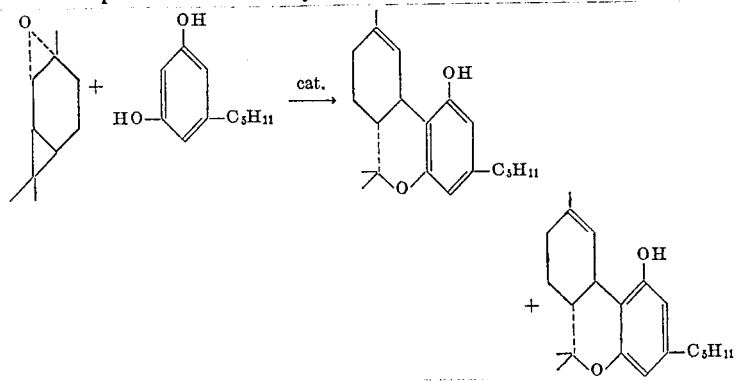

Both of the starting materials are available commercially, the carene oxide having been supplied by Glidden and Co. Carene oxide can be prepared by the method of Arbuzov and Vil' chinskaya, *Izv. Akad. Nauk SSSR, Ser. Khim.*, 954 (1967); cf Chem. Abstr., 68, 22063 (1968).

More specifically, it has been found that by allowing (+)-trans-2-carene oxide to react with an equimolar quantity of olivetol in the presence of p-toluenesulfonic acid (0.05 mol/mol of olivetol) in benzene, a complex mixture of products is obtained. This mixture contains 23% Δ⁸-THC, 7% Δ⁹-THC, 13 percent citrylidenecannabis 11% cannabis iso-THC, and 34 percent unreacted olivetol. Careful chromatography of this mixture on silica gel and elution with 60:40 hexane-benzene, followed by chromatography on Florisil and elution with 2:98 ether-petroleum ether (bp 30°–40°), gives (−)-Δ⁸-THC (infrared nmr, glc, and tlc identical with those of authentic material; [α]D −245° (CHCl₃), indicating an optical purity of ca. 95 percent). Since (−)-Δ⁸-THC has already been converted to (−)-Δ⁹-THC, as described above, this route constitutes yet another stereospecific synthesis of (−)-trans-Δ⁹-THC.

It was then found that in the above condensation reaction, if the molar ratio of carene oxide is increased (1.6 mol/mol of olivetol), the major products formed are Δ⁹-trans-THC (28 percent) and Δ⁹-cis-THC together with other products, but no Δ⁸-THC is formed (Scheme I). Similar results are obtained by the addition of 1 percent boron trifluoride etherate in methylene chloride to an equimolar ratio of carene oxide and olivetol in methylene chloride at room temperature. The mixture of products thus obtained is chromatographed on Florisil and eluted with 2:98 ether-petroleum ether (30°–40°). A fraction, [α]D −59° (CHCl₃), contains trans-Δ⁹-THC and cis-Δ⁹-THC (60:40 ratio), as shown by gas chromatographic and nmr analyses and by conversion to Δ⁸-THC and iso-THCs on treatment with p-toluenesulfonic acid in refluxing benzene. This fraction is separated by preparative vpc (column 3.8 percent SE 30 on Diatoport S; gas, helium; oven temperature, 240°) to give (−)-Δ⁹-THC with an optical purity of >80 percent by comparison with the ORD curve of an authentic sample. This therefore provides the first one-step synthesis of optically active Δ⁹-THC.

Scheme I

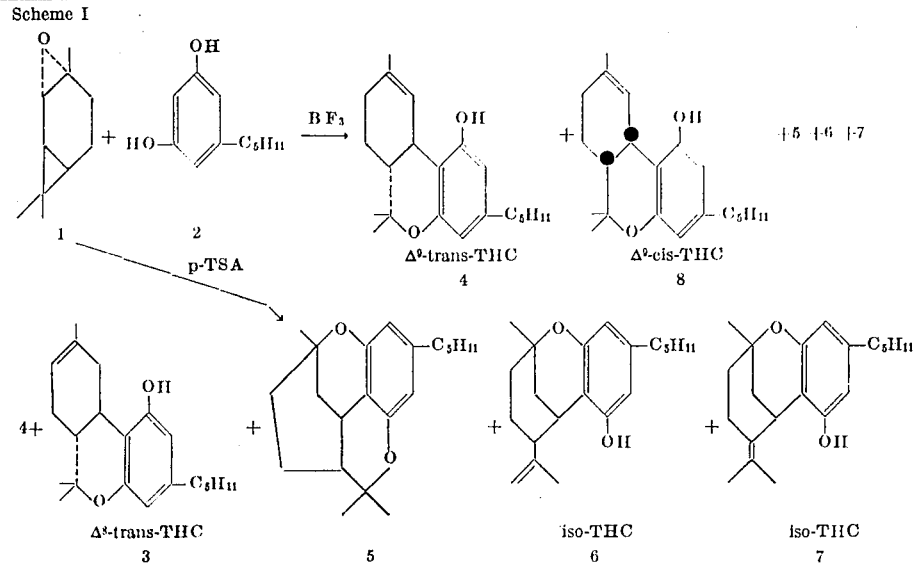

It is interesting to note that no cannabidiol is formed in any of these reactions and the ratio of trans to cis products is ca. 1.2 with p-toluenesulfonic acid, whereas it is ca. 0.6 (i.e., increase of cis products) with the use of boron trifluoride etherate. We interpret these results as suggesting that trans- and cis-$\Delta^9$-THCs are first formed (Scheme II) and are then converted into their transformation products 3 and 5→7, respectively. This is in complete agreement with the known acid-catalyzed transformation in cannabinoids. Furthermore, the results suggest that the reaction has a more concerted character when a nonprotonic acid catalyst like $BF_3$ is used, whereas acid catalysts like p-TSA, which gives a more carbonium ion character to the allylic system in the intermediate 9, give the trans products, which are more thermodynamically and kinetically stable.

Scheme II

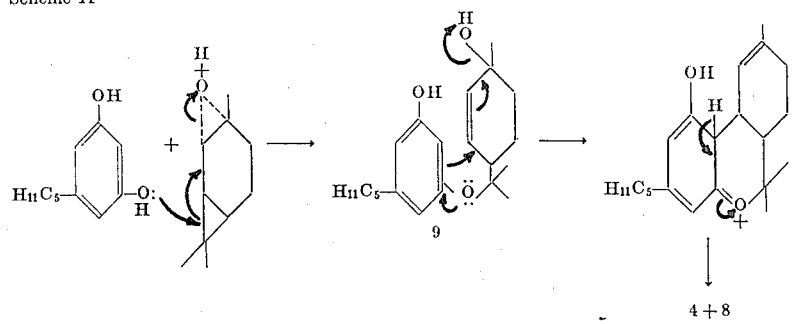

EXAMPLE 1

A solution of 24.5 g (0.16 mole) of 2-carene oxide in 60 ml of benzene was added during 30 min. to a stirred solution of 18.0 g (0.1 mole) of olivetol and 0.3 g (0.00158 mole) of p-toluene-sulfonic acid monohydrate in 100 ml of benzene. The temperature was held at 18°–20° C by cooling the flask and contents in a water bath at 10°–15° C. The solution was then heated to reflux under a Dean-Stark trap until the vapor temperature was 80° C and all water had been removed; about 45 min. was required. The cooled solution was washed to neutrality with water and dried over anhydrous sodium sulfate. Removal of solvent at reduced pressure left 38 g of a red-orange, cloudy resin. Analysis by gas chromatography showed this product contained about 10 percent each of unreacted olivetol, cis-$\Delta^9$-tetrahydrocannabinol, trans-$\Delta^9$-tetrahydrocannabinol, $\Delta^{9,11}$-tetrahydrocannabinol and isotetrahydrocannabinol. There was no peak corresponding to $\Delta^8$-tetrahydrocannabinol.

This composition was confirmed upon examination of fractions obtained from a liquid-solid column chromatographic separation of 5 g of this red-orange resin or silica gel, eluted with 70:30 hexane:benzene (loading ratio 15:1). The identifications were made by comparison of retention times in gas chromatography with retention times of authentic samples of the individual components. Additional confirmation of the cis- and trans-$\Delta^9$-tetrahydrocannabinols was obtained when one fraction (0.13 g), consisting of equal amounts of these two components, was heated in benzene solution with catalytic amounts of p-toluenesulfonic acid. Products of this treatment were shown, by gas chromatography, to consist of $\Delta^8$-tetrahydrocannabinol and isotetrahydrocannabinols, which are the typical products formed from trans-$\Delta^9$- and cis-$\Delta^9$-tetrahydrocannabinol, respectively, when heated in an acid environment.

EXAMPLE 2

With stirring and cooling in an ice bath, 0.2 ml of 45 percent boron trifluoride etherate solution in 5 ml of methylene chloride was added dropwise to a solution of 1.8 g of olivetol and 1.8 g of $\Delta^2$-carene oxide in 15 ml of methylene chloride. The now brownish-red mixture was allowed to warm to room temperature. After 1 hour approximately 50 ml of ether was added and the reaction was quenched by adding it to 10 percent sodium bicarbonate solution. The organic layer was separated, washed with sodium bicarbonate solution, and then with water to neutrality. It was dried and evaporated to leave a dark gum. This gum was chromatographed on Florisil and eluted with 2:98 ether/petroleum ether (30°–40°). A fraction was isolated containing $\Delta^9$-cis and $\Delta^9$-trans-THCs (40:60 ratio) as shown by gas chromatographic and nmr analyses. The compounds were identified by glc on the basis of relative retention times of authentic samples and by addition of authentic samples to the reaction mixture with subsequent glc. The nmr showed a clear separation of signals at δ ($CDCl_3$) 1.08 (s, one of the geminal methyls) and 3.18 (br, d, C-3proton), which correspond to $\Delta^9$-trans-THC, and similarly 1.26 (s) and 3.56 (br) corresponding to $\Delta^9$-cis-THC. This fraction was further separated by preparative vpc (column, 3.8% SE 30 on Diatoport S; carrier gas, helium; oven temperature, 240°) to give (−)-$\Delta^9$-trans-THC with an optical purity of >80 percent by comparison with the optical rotatory dispersion curve of an authentic sample. Both ORD curves were found to be parallel in the 280–600 mμ region; [α]D −131 ± 2° (cyclohexane); an authentic sample of (−)-4 had [α]D −148 ± 2°.

The invention now having been described by reference to certain preferred embodiments thereof, it is obvious the objects set forth at the outset of the specification have been met. The invention may be otherwise variously embodied and practiced, within the scope of the following claims.

What is claimed is:

1. A method for the stereospecific synthesis of $\Delta^9$-tetrahydrocannabinol comprising condensing olivetol with $\Delta^2$-carene oxide.

2. A method as defined in claim 1, wherein said condensation is performed in the presence of an acid catalyst.

3. A method as defined in claim 1, wherein said catalyst is selected from the group consisting of boron trifluoride and p-toluenesulfonic acid.

4. A method as defined in claim 3, wherein said $\Delta^2$-carene oxide and said olivetol are present in a molar ratio of 1.6:1 and said catalyst is p-toluenesulfonic acid.

5. A method as defined in claim 3, wherein said $\Delta^2$- carene oxide and said olivetol are present in equimolar amounts.

6. A method as defined in claim 1, further comprising separating said $\Delta^9$-tetrahydrocannabinol into trans-$\Delta^9$-tetrahydrocannabinol and cis-$\Delta^9$-tetrahydrocannabinol.

7. A method as defined in claim 6, wherein said trans- and cis-$\Delta^9$-tetrahydrocannabinol are separated by vapor phase chromatography.

* * * * *